United States Patent [19]

Göschel

[11] 4,288,051

[45] Sep. 8, 1981

[54] METHOD AND APPARATUS FOR CONTROLLING A SATELLITE

[75] Inventor: Wilhelm Göschel, Taufkirchen, Fed. Rep. of Germany

[73] Assignee: Messerschmitt-Bölkow-Blohm Gesellschaft mit beschränkter Haftung, Munich, Fed. Rep. of Germany

[21] Appl. No.: 31,526

[22] Filed: Apr. 19, 1979

Related U.S. Application Data

[63] Continuation of Ser. No. 832,791, Sep. 12, 1977, abandoned.

[30] Foreign Application Priority Data

Sep. 18, 1976 [DE] Fed. Rep. of Germany ....... 2642061

[51] Int. Cl.$^3$ .......................... B64G 1/24; B64G 1/26; B64G 1/28; B64G 1/36
[52] U.S. Cl. .................................... 244/164; 244/165; 244/169; 244/171
[58] Field of Search ............... 244/165, 169, 164, 171, 244/3.2, 3.21, 3.22, 172, 170, 158, 176

[56] References Cited

U.S. PATENT DOCUMENTS

| | | | |
|---|---|---|---|
| 3,231,223 | 1/1966 | Upper | 244/169 X |
| 3,359,407 | 12/1967 | Paige | 244/169 X |
| 3,396,920 | 8/1968 | Rosen et al. | 244/169 |
| 3,511,452 | 5/1970 | Smith et al. | 244/165 |
| 3,767,139 | 10/1973 | Fischell | 244/165 |
| 3,866,025 | 2/1975 | Cavanagh | 244/169 |
| 4,071,211 | 1/1978 | Muhlfelder et al. | 244/165 |

OTHER PUBLICATIONS

Cau, "The Altitude and Orbit Control System of the Orbital Test Satellite", Institution of Electrical Engineers, 1975 International Conference on Satellite Communications Systems Technology, 4/7-10/1975, pp. 75-80.

*Primary Examiner*—Galen L. Barefoot
*Attorney, Agent, or Firm*—Toren, McGeady and Stanger

[57] ABSTRACT

A satellite, especially a geostationary satellite which may be stabilized in its three major axes and which has a spin wheel or momentum wheel supporting a position control system and which also has an engine or propelling system, is controlled by actuating the spin or momentum wheel at the latest when the satellite is in a phase of being transferred from one orbit to another orbit. Thereafter, the satellite is rotated about its axis which extends in parallel to the axis of the spin wheel or momentum wheel whereby the rotational impulse of the satellite is smaller than that of the momentum wheel. The stabilizing of the satellite relative to the three major axes is then made at the point in time when the satellite is to change from one orbit to another orbit whereupon the engine system for reaching the new orbit is switched on. The thrust of the engine system is so dimensioned that the position control system intended for a subsequent mission retains its orientation even during the phase of changing orbits. At least one momentum or spin wheel is effective in the position control of the satellite in each operational phase of the satellite. A drive or propelling system for a position control in the three axial directions is provided along with liquid fuel drive engines for the orbit change and for the orbit correction.

17 Claims, 3 Drawing Figures

METHOD AND APPARATUS FOR CONTROLLING A SATELLITE

This is a continuation of application Ser. No. 832,791, filed Sept. 12, 1977 now abandoned.

BACKGROUND OF THE INVENTION

The present invention relates to a method and apparatus for controlling a satellite. More specifically, the method and apparatus relates to controlling the position and varying the orbit of a satellite which may be stabilized in three major axes. The present method and system is especially adapted for a geostationary satellite equipped with propelling systems and at least one position control system supported by a spin or momentum wheel.

In order to maximize the payload, especially in geostationary satellites, it is customary to propel the satellite first into an elliptical transfer orbit. Such orbit has an apogee with a height corresponding approximately to the subsequent orbital height of a geostationary satellite. Such transfer orbit has a low perigee in the range of a few one hundred kilometers. Following any desired number of orbits in the transfer orbit, the satellite is lifted in the apogee of the transfer orbit into an orbit in synchronism with the earth, whereby the lifting is accomplished with a driving or propelling system also referred to as the apogee engine. In addition to the apogee engine there is provided an orbit correction system which serves for precisely adjusting the orbital speed in terms of centimeters per second in order to assure a good synchronization with the rotation of the earth. These propelling or drive systems also control the steering of the satellite into the desired position and the maintaining of such position during the useful life of the satellite thereby compensating for any attraction caused by the sun, the moon and also correcting any orbit distortions caused by solar pressure.

Such propelling systems may also be employed for the steering of satellites into any desired flying trajectories not geostationary whereby such satellites may be intended for other missions.

Heretofore, it was customary to use in connection with satellites of the mentioned type different propelling and position control methods for the two basically different maneuver phases, namely transfer trajectory and orbit, for example, such as a geostationary orbit.

The necessity to use different position control methods during the two maneuvering phases results from the fact that heretofore a solid fuel engine was used for the apogee engine or motor. However, the thrust of solid fuel engines is relatively high. As a result, the passive gyro stabilization by means of a spin wheel or momentum wheel alone is not strong enough. This is so during the change of orbit phase as well as in any other trajectory or orbit correction which may subsequently become necessary. Such momentum or spin wheels are insufficient to take up the high moments which occur as the result of the use of solid fuel engines. Thus, according to the prior art it is customary to use in the transfer phase a momentum or spin stabilization. If the satellite is of elongated construction, the spin is applied generally around the axis of the smallest main or primary moment of inertia. An elongated satellite, incidentally, is best adapted to the space available in the nose cone of a rocket. The application of a spin about the axis of the smallest moment of inertia, however, results in a rotation which is not stable so that nutations which cannot be avoided due to disturbances, must be constantly counteracted by a positive or active nutation damping.

Solid fuel engines are also employed in order to minimize or avoid the vibration and dynamic stabilization problems which occur in the fuel tank system of liquid fuel engines. In connection with the just described technical concept of the prior art to employ a solid fuel engine as an apogee engine or as a trajectory or orbit change engine and to employ different methods of stabilization, difficult maneuver sequences cannot be avoided. Further, a high material expense which diminishes the payload and which increases the costs can also not be avoided. Furthermore, it is difficult to guess that nutations that might occur in outer space, not to speak of testing such nutations. As a result, it is very critical to design and construct the active nutation damping. In addition, it is sensible to make the trajectory or orbit corrections, which are necessary during the entire useful life of a satellite, by means of liquid fuel drive systems or engines. Thus, at least two different engine systems must be provided for the change of orbit on the one hand and for the position control or orbit correction on the other hand. Such different drive systems based on different types of fuels require separate storage and separate conduit systems as well as separate instrumentation and so forth. An example of the just described prior art technique is described in the RCA Paper, 1975 under the title "RCA's Three Axes Communication Satellite" (RCA-SATCOM Satellite).

OBJECTS OF THE INVENTIONS

In view of the above it is the aim of the invention to achieve the following objects singly or in combination:

to provide a position control or regulating method as well as a trajectory change method for a satellite which will assure the stability of the satellite, especially a geostationary satellite;

to provide a method of the just described type which will operate in the transfer phase as well as in any desired trajectory or orbit change or correction phase with a uniform position regulating system, in other words with the same system;

to provide an apparatus for performing the trajectory or orbit transfer as well as the trajectory or orbit correction by the same control and/or regulating means;

to employ a liquid fuel engine system for the trajectory or orbit change and for the orbit correction; and to supply the liquid fuel to all engines from a common tank system and through a common conveying system.

SUMMARY OF THE INVENTION

According to the invention there is provided a method for the position regulation and for the change of the trajectory or orbit of a satellite which is capable of being stabilized in the three major axes. The present method is especially suitable for geostationary satellites and involves the following steps. The spin or momentum wheel is activated at the latest in the transfer phase. The satellite is rotated with a spin impulse which is smaller than the spin impulse of the momentum wheel. The just mentioned rotation of the satellite takes place about the satellite axis extending in parallel to the spin or momentum axis of said momentum or spin wheel. Preferably, the satellite rotation is constant. The stabilizaton relative to the three axes is performed at the point of time when the trajectory or orbit change is to take place. The engine or drive systems for reaching the new orbit are switched on and the thrust of the drive or engine systems is so dimensioned that the position regulating system which serves for a subsequent mission may retain its orientation also during the phase of orbit change.

The apparatus for performing the just enumerated steps of the present method comprises at least one spin or momentum wheel which cooperates in the position regulation of the satellite during any flight phase of the satellite. The apparatus further includes a drive or engine system for actively controlling the satellite relative to its three major axes. The apparatus further includes liquid fuel power systems for the change of the trajectory or orbit as well as for the correction of the trajectory or orbit.

It is a special advantage of the invention that the present method may be performed solely by using position regulating or control components, which are also necessary in the final orbit of the satellite, for example a geostationary orbit of a satellite. In the method of the invention, advantage is taken of the damping characteristics of the liquids in the fuel tanks in cooperation with the spin impulse stored in the spin or momentum wheel. Such a system remains in a stable motion condition whereby the axis of the spin wheel assumes a position to point in the direction of the rotational impulse vector of the satellite which vector is fixed in space, said position will be maintained as long as the spin in the spin wheel is larger than the remaining spin of the satellite. It has been found to be a surprising advantage of the present invention that any possible nutations are automatically damped due to the liquid damping. Thus, a positive or active nutation damping is not necessary. Further the present method reduces the number of different manuevers and also results in a very simple system assembly requiring a low number of components with the resulting advantage of a substantial weight reduction whereby the payloads may be increased as compared to prior art systems.

BRIEF FIGURE DESCRIPTION

In order that the invention may be clearly understood, it will now be described, by way of example, with reference to the accompanying drawings, wherein.

DETAILED DESCRIPTION OF DETAILED EMBODIMENTS

Figure 1:
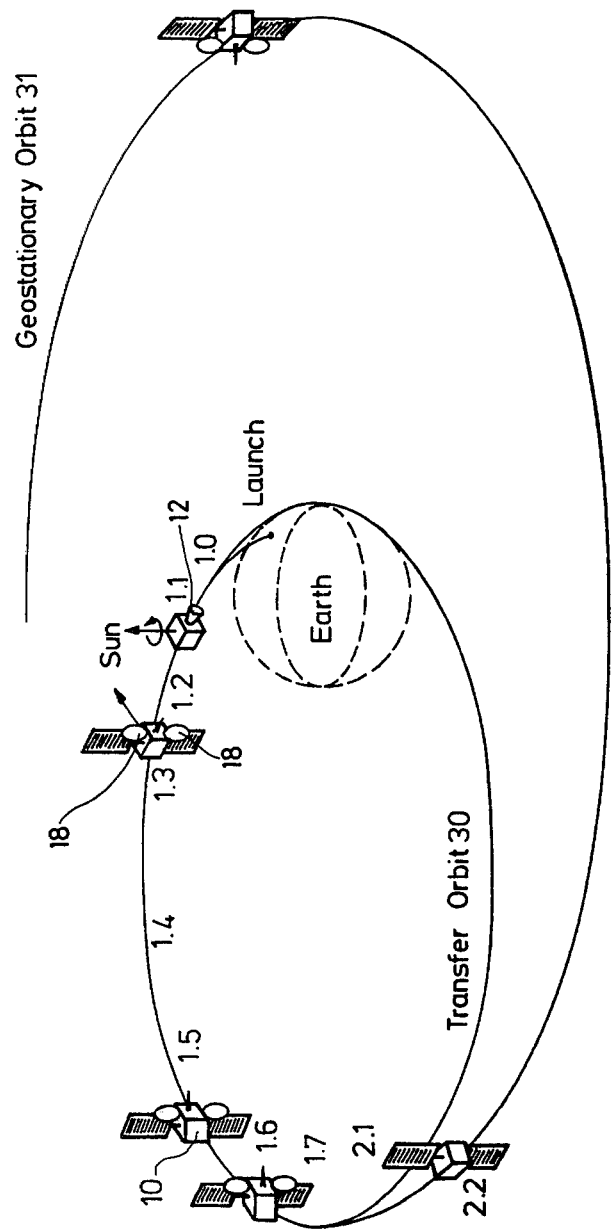
FIG. 1 illustrates the maneuver sequence for transfering a satellite from a transfer orbit into a geostationary orbit by the method according to the invention.
Figure 2:
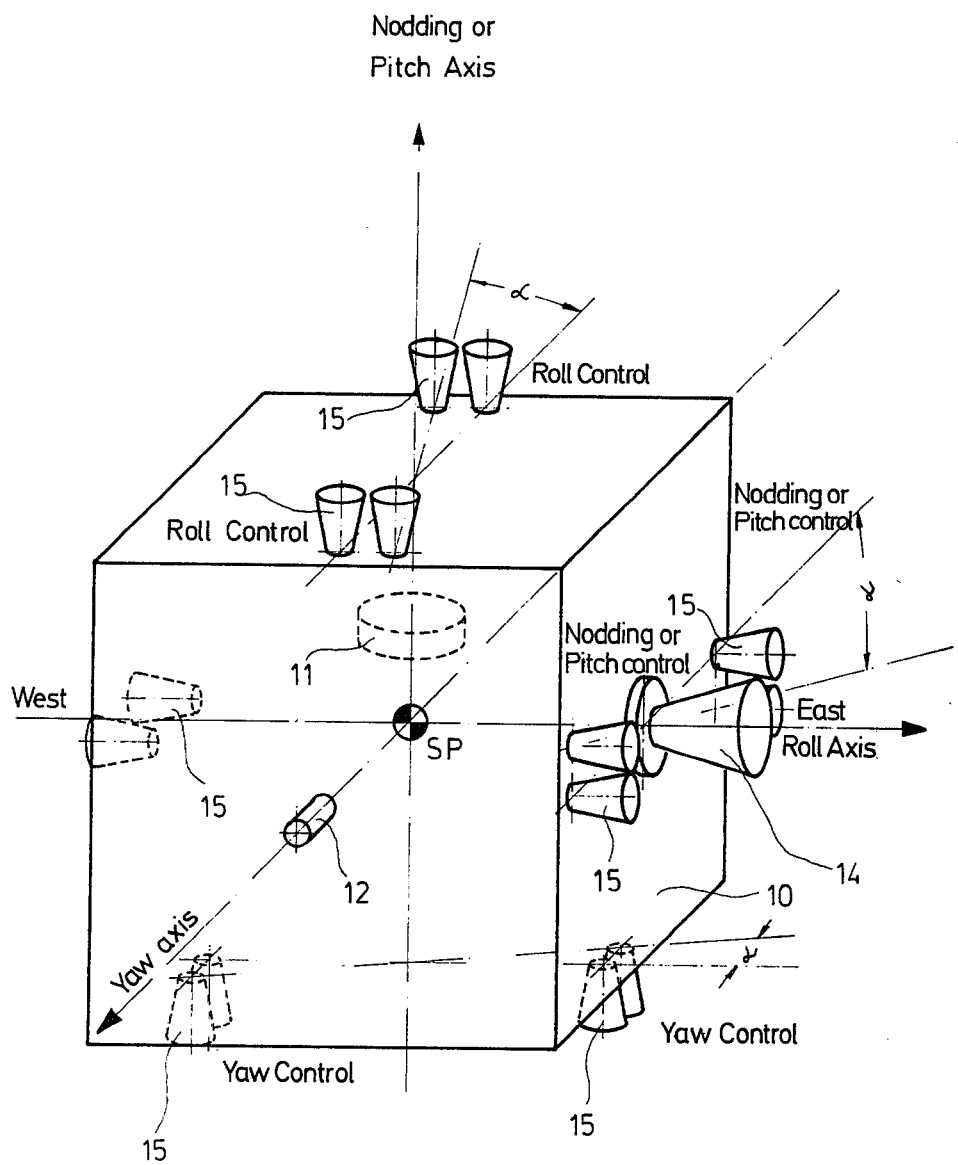
FIG. 2 illustrates the arrangement of the structural components essential for a satellite to be steered or controlled by the method of the invention.

FIG. 1 illustrates in a schematic way the transfer of a satellite from one orbit into another by employing the method of the invention whereby the satellite 10 is constructed as illustrated in a schematic manner in FIG. 2. The satellite 10 is to leave the transfer orbit 30 and enter into a geostationary orbit 31. The so called nodding axis (or pitch axis) of the satellite is oriented to extend perpendicularly to the plane defined by the transfer orbit 30. Such orientation of the nodding axis of the satellite is performed prior to the separation of the satellite from the carrier stage and it takes place at a point of time referred to as zero point of time. The orientation itself is not illustrated. However, the position regulating or control system of the last carrier stage is employed for the mentioned orientation of the nodding axis of the satellite.

A spin or momentum wheel 11 is then driven to a desired r.p.m., for example, 3500 r.p.m. For redundance purposes, two spin wheels will normally be employed. At the point of time 1.1, the satellite has already been separated from the carrier stage and rotates about its nodding axis, for example once every 20 minutes. For simplicity's sake, this rotation about the nodding axis may be maintained constant, for example, by means of a simple speed gyro functioning as a sensor for varying the r.p.m. of the spin wheel 11.

A suitable bearing or direction sensor 12, for example an infrared sensor, is employed to measure the position of the satellite relative to the earth. The sensor starts at the point of time 1.2 and then continues to take the satellite's bearing relative to the earth. Possibly necessary corrections of the direction of the nodding axis are performed at the point of time 1.4. In connection with a geostationary satellite, a three axes stabilization is the most advantageous type of stabilization due to the power and precision requirements. Thus, at the point of time 1.5 a transition is made to a three axes control. The earth and the sun serve as reference points whereby the necessary data are acquired by means of the infrared sensor 12 and a digital sun sensor not shown. The infrared sensor 12 and the digital sun sensor act as bearing taking sensors, while the three axes stabilization is accomplished by respective actuation of the engines of the propulsion system 15 shown in more detail in FIG. 2.

At the point of time, 1.6, the satellite 10 receives a ground command signal for orienting the satellite into its optimal rolling position in order to diminish the inclination of the previous orbit. The rotation of the satellite, which is necessary for bringing the satellite into its optimal rolling position, is accomplished by a simple shifting of the null point of the digital solar sensor. The adjustability or shiftability of the solar sensor is required in any event for the subsequent orbit corrections due to the different positions of the sun during different seasons of the year. Subseqüently, at the point of time 1.7 the so called apogee injection or the desired change of orbit is performed. For this purpose, an engine 14 is ignited by means of a ground control signal. At the point of time 2.1, that is, when the satellite is almost in its new orbit, the despinning of one spin wheel is performed, again by means of a ground command signal. At the point of time 2.2, the nodding axis of the satellite is oriented to extend perpendicularly to the plane of the new orbit 31. Subsequently, all orbit corrections are performed initially for the purpose of properly positioning the satellite and subsequently in order to maintain such proper satellite position in the new orbit.

According to FIG. 2, the propulsion system 14 is arranged in the rolling axis of the satellite. At least one spin or momentum wheel 11 is arranged with its rotational axis so that the latter coincides with the nodding axis or extends parallel to the nodding axis. It is advantageous to employ two spin wheels for redundance reasons. The spin wheels may be driven to their desired r.p.m. even prior to the launching of the carrier rocket. Thus, the energy balance of the carrier rocket and of the satellite is not influenced by the charging up of the spin wheels.

An infrared sensor, for example constructed as a bearing taking sensor 12 for ascertaining earth direction bearings, is arranged in the yaw axis of the satellite. As described, this sensor 12 serves to measure the nodding position of the satellite during the transfer phase, that is, when the latter is transferred from one orbit to another orbit. During the further operational life of the satellite, the sensor 12 provides data for orienting the satellite relative to the earth. The smaller propulsion units or engines 15 are part of the orbit correction system and are provided for all attitude control purposes as well as for all orbit correction purposes. The nozzles of these propulsion systems 15 are staggered by an angle $\alpha$ of about 10° for the rolling-yawing control.

Figure 3:
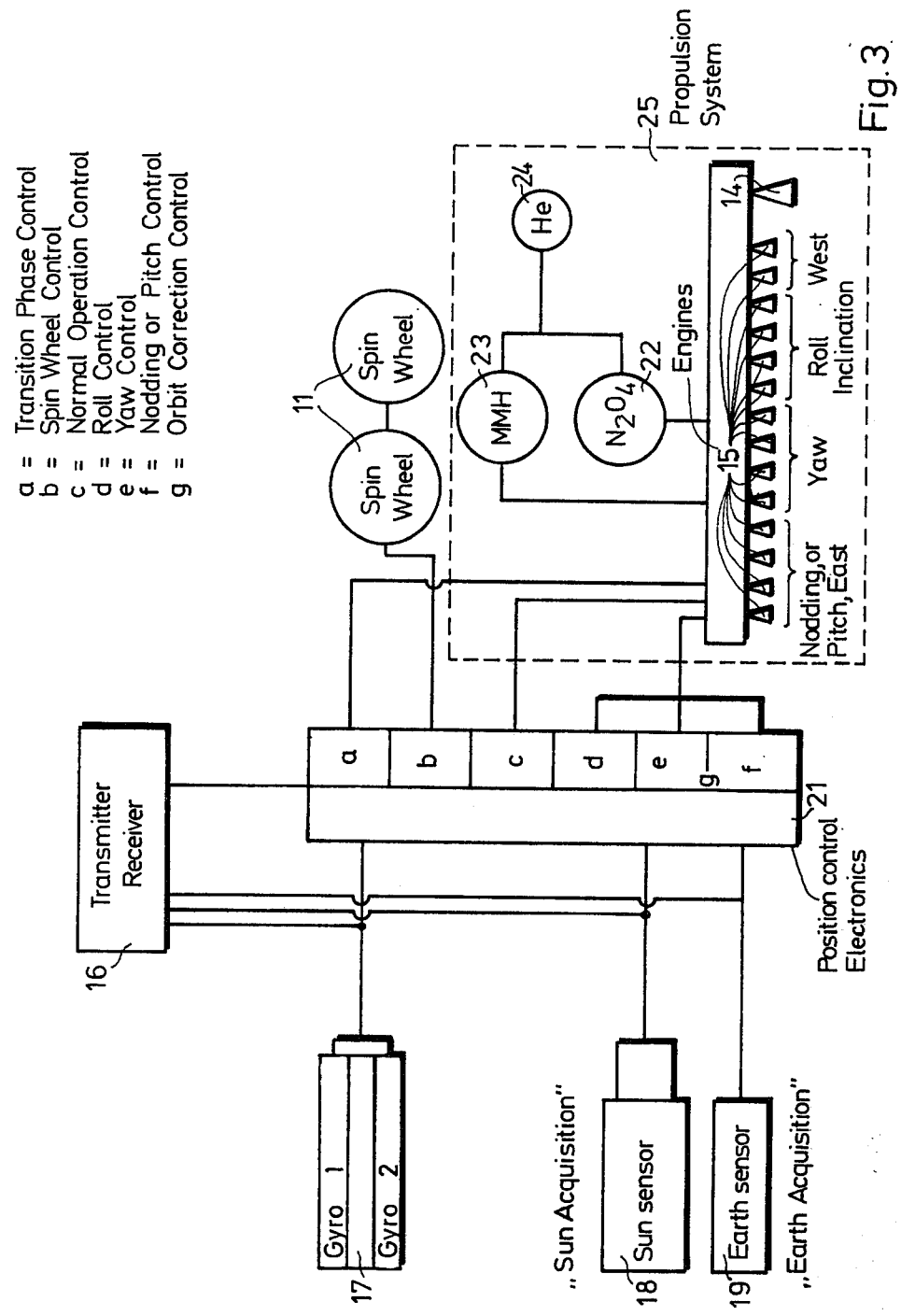
FIG. 3 shows a block diagram of a position regulating and orbit correction or varying system according to the invention.

FIG. 3 illustrates a block diagram of the essential components required for performing the position control and orbit change method according to the invention. The different types of operation of the position control or regulating electronic circuit arrangement 21 may be selected by means of the telemetric, telecommand system 16 of the satellite. The system 16 as well as the electronic circuit 21 are well known as such. Further, the output data of the sensors 17, 18 and 19 as well as other measured data may be transmitted down to earth through the system 16. The gyro means or packets 1 and 2 comprise each two redundant speed gyros for ascertaining the nodding angular speed. The sensors 18 and 19 ascertain solar data and earth data. The data ascertain by the sensors 18 and 19 are supplied to the position control electronic circuit arrangement 21 which controls during the three axes stabilization phase the nodding, the yawing as well as the rolling. During the transfer phase of the satellite from one orbit to the other, the r.p.m. of the spin wheel 11 or of the spin wheels 11 is controlled with the aid of these speed gyros 17.

Referring to FIG. 2, there are illustrated four position or attitude control jets, also referred to as small propulsion units 15, for each of the nodding, the yawing and the rolling orientations whereby the nodding jets simultaneously serve for the east orientation control. The rolling jets simultaneously serve for the diminishing of the inclination. Two further jets are provided for the west orientation. A further propulsion device 14 is used for changing the orbit. The propulsion device 14 is shown in FIG. 3 only. All the propulsion devices 15 as well as the propulsion device 14 are connected in common to the propulsion system 25 according to the invention. The nodding jets are oriented in the direction of the apogee propulsion engine, on the one hand, in order to be capable to perform the east orientation control and on the other hand, in order to be capable to take over the function of the orbit changing propulsion device 14 if the latter should not function properly. The nodding nozzles would burn for the purpose of changing from one orbit to another, however, it would take several revolutions to perform the change. All propulsion devices are supplied with fuel from the tanks 22, 23, and 24 provided in common. The fuel could, for example, be nitrogen tetroxite ($N_2O_4$) contained in tank 22 and monomethylhydrazine (MMH)($CH_3NHNH_2$) contained in tank 23. Further, tank 24 contains helium (HE) capable of maintaining a controlled supply pressure, for example, during the apogee injection or during further desired maneuvers.

Although the invention has been described with reference to specific example embodiments, it will be appreciated, that it is intended, to cover all modifications and equivalents within the scope of the appended claims.

Position Control Electronics 21 may be of the type, for example, disclosed in the U.S. Pat. No. 3,937,423 or in the AIAA-Paper No. 68-461.

Transmitter Receiver 16 may be of the type, for example, described in the U.S. Pat. No. 3,767,139.

What is claimed is:

1. A method for attitude control and trajectory change of a satellite having a mission encompassing a transfer phase wherein said satellite is spin-stabilized and a latter phase wherein said satellite is three-axis stabilized, said satellite having a momentum wheel, an attitude control system and propulsion means, said method comprising the steps of:

activating said momentum wheel at the latest in the transfer phase of the mission;

rotating said satellite about an axis of the satellite which is parallel to the spin axis of the momentum wheel with a smaller angular momentum than that of said momentum wheel during said spin-stabilization phase;

substantially changing the trajectory of said satellite from said transfer phase to a substantially different trajectory and stabilizing said satellite along three axes at the moment of said changing of trajectory; and selecting the thrust of said propulsion means to be effective to maintain proper satellite attitude during said changing of trajectory and for a period of three-axis stabilization after said trajectory is changed.

2. The method of claim 1, wherein said change of trajectory is from an elliptical transfer trajectory to a substantially circular trajectory.

3. The method of claim 1, wherein said rotating of said satellite is performed at a constant rate.

4. The method of claim 1, wherein said spinning stabilization phase is performed in an eccentric orbit about the Earth and a later three-axis stabilization phase is during a geostationary position with respect to the Earth.

5. The method of claim 1, wherein said mission of said satellite includes a phase wherein said satellite is carried by a final stage of a launch vehicle and wherein the step of activating said momentum wheel occurs prior to separation of said satellite from said final stage and wherein said method includes the step of rotating said launch stage and satellite prior to separation in such a manner that the satellite axis of rotation extends parallel to said momentum wheel axis and perpendicular to a predetermined trajectory.

6. The method of claim 1, further including the step of determining the position of the satellite spin axis during the spin-stabilized transfer phase by using a direction sensor and correcting the attitude of said satellite in response to said determination.

7. The method of claim 1, further including the step of adjusting the rotational rate of the satellite during the spin-stabilized transfer phase by controlling the rotational rate of said momentum wheel.

8. A method for attitude control and trajectory change of a satellite having a mission encompassing a transfer phase wherein said satellite is spin-stabilized and a latter phase wherein said satellite is three-axis stabilized, said satellite having a momentum wheel, an attitude control system and propulsion means, said method comprising the steps of:

activating said momentum wheel at the latest in the transfer phase of the mission;

rotating said satellite about an axis of the satellite which is parallel to the spin axis of the momentum wheel with a smaller angular momentum than that of said momentum wheel during said spin-stabilization phase;

substantially changing the trajectory of said satellite from said transfer phase to a substantially different trajectory and stabilizing said satellite along three axes at the moment of said changing of trajectory; and selecting the thrust of said propulsion means to be effective to maintain proper satellite attitude during said changing of trajectory and for a period of three-axis stabilization after said trajectory is changed;

and wherein said satellite includes sun and Earth sensors for three-axis stabilization, and further including the step of shifting the null point of said sun sensor rotating the satellite about an axis so that the impulse for changing the trajectory of the satellite will simultaneously change the inclination of the previous orbit.

9. A method for attitude control and trajectory change of a satellite having a mission encompassing a transfer phase wherein said satellite is spin-stabilized and a latter phase wherein said satellite is three-axis stabilized, said satellite having a momentum wheel, an attitude control system and propulsion means, said method comprising the steps of:

activating said momentum wheel at the latest in the transfer phase of the mission:

rotating said satellite about an axis of the satellite which is parallel to the spin axis of the momentum wheel with a smaller angular momentum than that of said momentum wheel during said spin-stabilized phase;

substantially changing the trajectory of said satellite from said transfer phase to a substantially different trajectory and stabilizing said satellite along three axis at the moment of said changing of trajectory; and selecting the thrust of said propulsion means to be effective to maintain proper satellite attitude during said changing of trajectory and for a period of three-axis stabilization after said trajectory is changed;

and including the step of de-spinning said momentum wheel when said satellite has substantially achieved a desired new orbit.

10. In a satellite with a mission including a spin-stabilized transfer phase and a subsequent three-axis stabilized phase, a satellite attitude control and trajectory changing system for controlling the attitude of said satellite during said spin-stabilized transfer phase and for effecting substantial change of trajectory and controlling the attitude of said satellite during said subsequent three-axis stabilized phase, comprising:

a momentum wheel, said wheel having a spin axis arranged to be parallel with the spin axis of said satellite during said spin-stabilized transfer phase of said satellite, said momentum wheel spin axis also being aligned with the pitch axis of said satellite in said three-axis stabilized phase;

means for causing said momentum wheel to spin at a rate wherein the angular momentum of said spinning satellite during the transfer phase is less than that of the momentum wheel;

means for providing signals for controlling the attitude of said satellite in said spinning and three-axis stabilized phases; and liquid fuel propulsion means responsive to said attitude control signals having a plurality of engines associated therewith, said engines being disposed on said satellite for providing appropriate thrust for substantially changing the trajectory of the satellite when leaving the transfer phase and for stabilizing the attitude of the satellite.

11. The system of claim 10, wherein said liquid fuel propulsion means includes a common fuel storage and distribution system, said propulsion means including a portion for changing the trajectory and a separate portion for correcting the attitude of the satellite.

12. The system of claim 11, wherein said liquid fuel propulsion means includes two pairs of engines disposed on the satellite for each of the roll, pitch and yaw axes respectively for controlling the attitude.

13. The system of claim 12, wherein said trajectory changing portion is arranged parallel to one of the pairs of engines.

14. In a satellite with a mission including a spin-stabilized transfer phase and a subsequent three-axis stabilized phase, a satellite attitude control and trajectory changing system for controlling the attitude of said satellite during said spin-stabilized transfer phase and for effecting substantial change of trajectory and controlling the attitude of said satellite during said subsequent three-axis stabilized phase, comprising:

a momentum wheel, said wheel having a spin axis arranged to be parallel with the spin axis of said satellite during said spin-stabilized transfer phase of said satellite, said momentum wheel spin axis also being aligned with the pitch axis of said satellite in said three-axis stabilized phase;

means for causing said momentum wheel to spin at a rate wherein the angular momentum of said spinning satellite during the transfer phase is less than that of the momentum wheel;

means for providing signals for controlling the attitude of said satellite in said spinning and three-axis stabilized phases; and liquid fuel propulsion means responsive to said attitude control signals having a plurality of engines associated therewith, said engines being disposed on said satellite for providing appropriate thrust for substantially changing the trajectory of the satellite when leaving the transfer phase and for stabilizing the attitude of the satellite, wherein said liquid fuel propulsion means includes a common fuel storage and distribution system, said propulsion means including a portion for changing the trajectory and a separate portion for correcting the attitude of the satellite, wherein said liquid fuel propulsion means includes two pairs of engines disposed on the satellite for each of the roll, pitch and yaw axes respectively for controlling the attitude and wherein each pair of said two pairs of engines for each axis are offset with respect to the other pair.

15. In a satellite with a mission including a spin-stabilized transfer phase and a subsequent three-axis stabilized phase, a satellite attitude control and trajectory changing system for controlling the attitude of said satellite during said spin-stabilized transfer phase and for effecting substantial change of trajectory and controlling the attitude of said satellite during said subsequent three-axis phase, comprising:

a momentum wheel, said wheel having a spin axis arranged to be parallel with the spin axis of said satellite during said spin-stabilized transfer phase of said satellite, said momentum wheel spin axis also being aligned with the pitch axis of said satellite in said subsequent three-axis stabilized phase;

means for causing said momentum wheel to spin at a rate wherein the angular momentum of said spinning satellite during the transfer phase is less than that of the momentum wheel;

means for providing signals for controlling the attitude of said satellite in said spinning and three-axis stabilized phases; and liquid fuel propulsion means responsive to said attitude control signals having a plurality of engines associated therewith, said engines being disposed on said satellite for providing appropriate thrust for substantially changing the trajectory of the satellite when leaving the transfer phase and for stabilizing the attitude of the satellite;

and wherein said satellite includes telemetry means for receiving a ground control signal, said satellite including means responsive to said ground control signal for activating said propulsion means to effect change of trajectory from said transfer phase to said three-axis stabilized phase.

16. In a satellite with a mission including a spin-stabilized transfer phase and a subsequent three-axis stabilized phase, a satellite attitude control and trajectory changing system for controlling the attitude of said satellite during said spin-stabilized transfer phase and for effecting substantial change of trajectory and controlling the attitude of said satellite during said subsequent three-axis stabilized phase, comprising:

a momentum wheel, said wheel having a spin axis arranged to be parallel with the spin axis of said satellite during said spin-stabilized transfer phase of said satellite, said momentum wheel axis also being aligned with the pitch axis of said satellite in said subsequent three-axis stabilized phase;

means for causing said momentum wheel to spin at a rate wherein the angular momentum of said spinning satellite during the transfer phase is less than that of the momentum wheel;

means for providing signals for controlling the attitude of said satellite in said spinning and three-axis stabilized phases; and liquid fuel propulsion means responsive to said attitude control signals having a plurality of engines associated therewith, said engines being disposed on said satellite for providing appropriate thrust for substantially changing the trajectory of the satellite when leaving the transfer phase and for stabilizing the attitude of the satellite;

and including means for controlling the rotational speed of said satellite during said spin-stabilized phase.

17. In a satellite with a mission including a spin-stabilized transfer phase and a subsequent three-axis stabilized phase, a satellite attitude control and trajectory changing system for controlling the attitude of said satellite during said spin-stabilized transfer phase and for effecting substantial change of trajectory and controlling the attitude of said satellite during said subsequent thee-axis stabilized phase, comprising:

a momentum wheel, said wheel having a spin axis arranged to be parallel with the spin axis of said satellite during said spin-stabilized transfer phase of said satellite, said momentum wheel spin axis also being aligned with the pitch axis of said satellite in said subsequent three-axis stabilized phase;

means for causing said momentum wheel to spin at a rate wherein the angular momentum of said spinning satellite during the transfer phase is less than that of the momentum wheel;

means for providing signals for controlling the attitude of said satellite in said spinning and three-axis stabilized phases; and liquid fuel propulsion means responsive to said attitude control signals having a plurality of engines associated therewith, said engines being disposed on said satellite for providing appropriate thrust for substantially changing the trajectory of the satellite when leaving the transfer phase and for stabilizing the attitude of the satellite;

and including sensor means for monitoring the Earth and sun positions in said three-axis phase, said Earth sensor means also for providing a signal for controlling the rotational speed of the satellite during said spin-stabilized phase.

* * * * *